(12) United States Patent
Kalra

(10) Patent No.: US 9,710,638 B2
(45) Date of Patent: Jul. 18, 2017

(54) UNICODE-BASED IMAGE GENERATION AND TESTING

(71) Applicant: salesforce.com, inc., San Francisco, CA (US)

(72) Inventor: Gursev Singh Kalra, Foster City, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 137 days.

(21) Appl. No.: 14/838,903

(22) Filed: Aug. 28, 2015

(65) Prior Publication Data

US 2017/0061115 A1 Mar. 2, 2017

(51) Int. Cl.
G06F 21/36 (2013.01)

(52) U.S. Cl.
CPC ...... *G06F 21/36* (2013.01); *G06F 2221/2133* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

OTHER PUBLICATIONS

U.S. Appl. No. 13/986,251, filed Apr. 16, 2013.

*Primary Examiner* — Michael R Vaughan
(74) *Attorney, Agent, or Firm* — Dergosits & Noah LLP; Todd A. Noah

(57) ABSTRACT

Systems and methods for testing to tell computers and humans apart and generating said tests are described. An interface is generated that includes a challenge and a response is provided, and a plurality of user selections of locations in the interface are received. A server compares the x coordinate and the y coordinate of each user selection with x and y coordinates for a subset of the plurality of characters in the response to obtain a distance value for each user selection. The server then sums the distance values for each user selection to obtain a total distance value. The server subsequently compares the total distance to a predetermined threshold, the server validating the user response when the total distance is less than the predetermined threshold, the validating causing access to be provided to web content specified in the user request.

20 Claims, 15 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,104,854 B2 * | 8/2015 | Xiao ................... G06F 21/36 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2011/0072498 A1 * | 3/2011 | Li ................... G06F 21/36 726/6 |
| 2011/0283346 A1 * | 11/2011 | Li ................... G06F 21/36 726/7 |
| 2011/0314537 A1 * | 12/2011 | Hulten ............. G06F 21/31 726/17 |
| 2012/0167204 A1 * | 6/2012 | Akka ............... G06F 21/36 726/22 |
| 2012/0232907 A1 * | 9/2012 | Ivey ................. G06F 21/30 704/273 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0250538 A1 * | 9/2014 | Rapaport ......... G06F 21/31 726/28 |
| 2014/0359537 A1 | 12/2014 | Jackobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2015/0365401 A1 * | 12/2015 | Brown ............. H04L 63/0838 726/7 |
| 2016/0191505 A1 * | 6/2016 | Frank .............. G09C 5/00 726/7 |

* cited by examiner

UNICODE-BASED IMAGE GENERATION AND TESTING

FIELD OF THE INVENTION

One or more implementations relate generally to images for tests to tell computers and humans apart, specifically the automatic generation of Unicode-based tests and application of said tests.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

In the field of online security for web sites, tests may be used to validate that a user of a web site is a human, and not automated software, which is often used to scan content of web sites on the Internet. A "Completely Automated Public Turing Test to tell Computers and Humans Apart," or "CAPTCHA," is a particular type of test to distinguish computers and humans used to prevent automated software from performing actions that degrade the quality of service of a given system. CAPTCHAs aim to ensure that the users of applications are human and ultimately aid in preventing unauthorized access and abuse. Conventional CAPTCHAs tend to utilize words, phrases, or combinations thereof, that are obscured, yet still legible to human users. Users, to provide a valid response and gain access to the secured data, must recognize the word or phrase displayed, and type what they see in the CAPTCHA image into a text box. If what the user types matches the text in the displayed image, the user may be given access to the secured data.

However, these conventional, recognition-based CAPTCHAs are subject to several disadvantages. First, word-recognition CAPTCHAs require typing of each character displayed in the CAPTCHA image; this can lead to failure based on user typing error, or an inability to type a valid response, if the user's keyboard does not include the characters displayed (e.g., the characters are in Japanese, but the user only has access to an English keyboard). Furthermore, word-recognition CAPTCHAs are limited to the characters in the alphabet (and/or numbers and punctuation) as potential solutions. This does not provide as much security (e.g., against computerized guessing) as a larger set of potential characters would.

Systems and methods for testing to tell computers and humans apart and generating said tests are described. To generate a test, a selection of a range of characters at least including the 8-bit ASCII character range is received. Each character in the selected range of characters is tested to determine if the character has a glyph in the selected font, if the character is a whitespace character, and if the character leaves a visible impression. From all the characters in the selected range of characters that pass the tests, a plurality of characters is selected for a challenge, and a larger set of characters (that includes the plurality of characters from the challenge) is selected for a response. An image is generated that includes the challenge and the response, and a solution threshold is calculated based on the font sizes of the challenge characters within the generated response.

Figure 1:
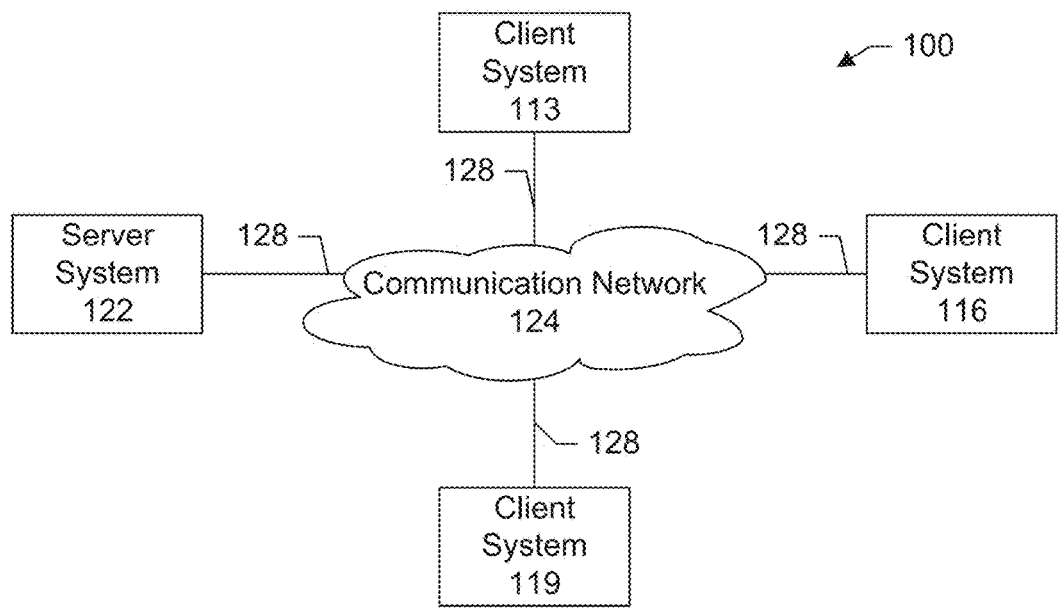
FIG. 1 shows a block diagram of an exemplary client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer® browser program provided by Microsoft® Corporation, and the Firefox® browser provided by Mozilla® Foundation, and others.

Figure 2:
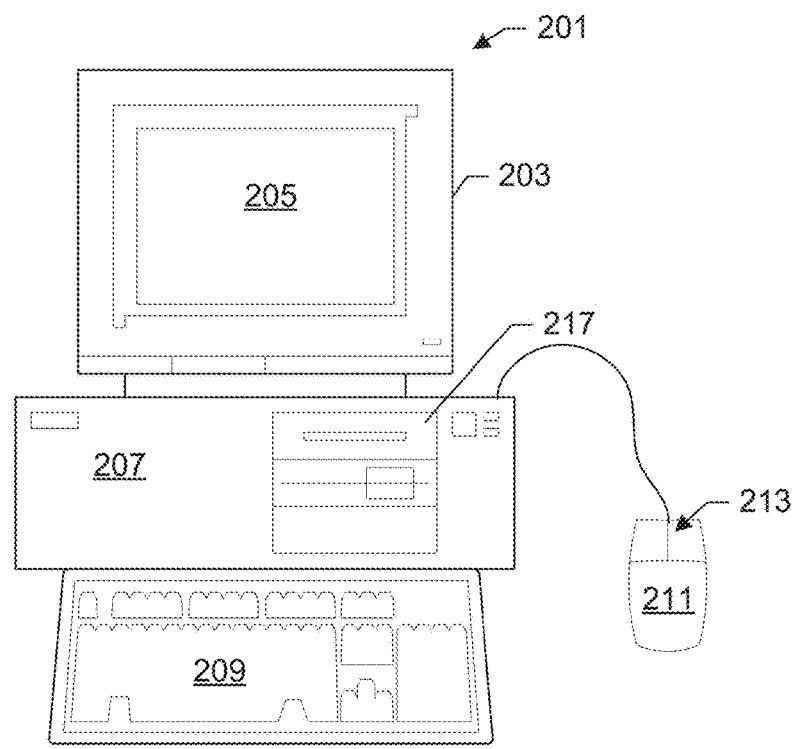
FIG. 2 shows a more detailed diagram of an example client or computer which may be used in an implementation of the invention, under an embodiment.

FIG. 2 shows an example client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc®), flash and other nonvolatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
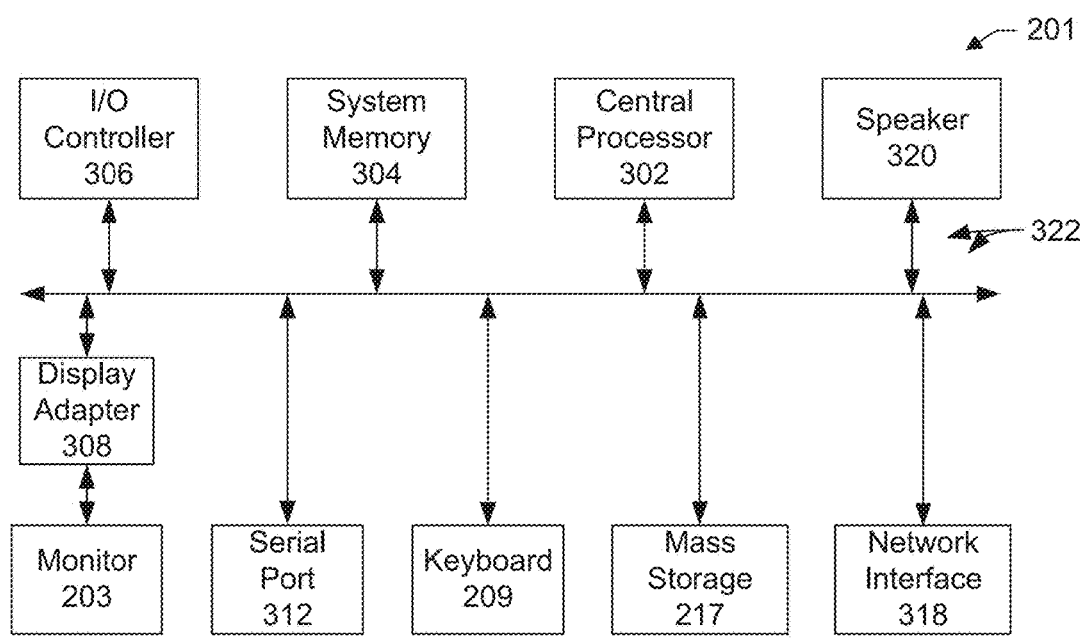
FIG. 3 shows a system block diagram of a client computer system, under an embodiment.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab® (from MathWorks), SAS, SPSS, JavaScript®, AJAX, Java®, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans® (from Oracle Corporation) or Enterprise Java Beans® (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95®, 98, Me, Windows NT®, Windows 2000®, Windows XP®, Windows XP® x64 Edition, Windows Vista®, Windows 7®, Windows CE®, Windows Mobile®), Linux, HP-UX, UNIX, Sun OS®, Solaris®, Mac OS X®, Alpha OS®, AIX, IRIX32, or IRIX64. Other operating systems may be used. Microsoft Windows® is a trademark of Microsoft® Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
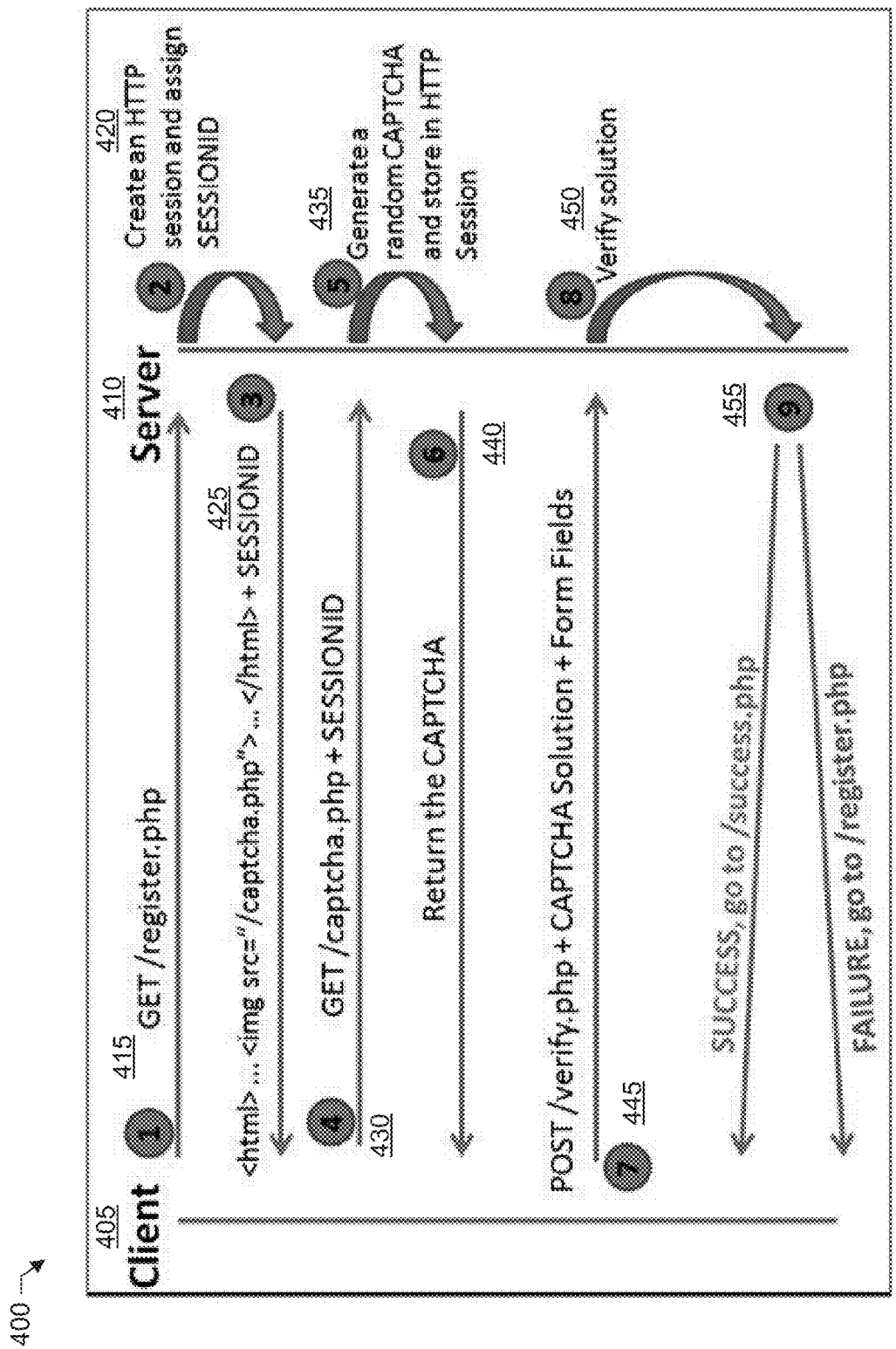
FIG. 4 illustrates a representative data flow for generating a test to tell computers and humans apart and validating the result of the test.

FIG. 4 illustrates a representative data flow 400 for generating a test to tell computers and humans apart and validating the result of the test. A client 405 may visit a registration page of a website at step 415. The website may create an HTTP session, assign it a SESSIONID and return the registration page to the client along with the SESSIONID cookie at step 420. The returned registration page may also contain an image tag that directs the browser to retrieve a test, such as a visual CAPTCHA and display it on a screen of the client at step 425. Upon parsing the image tag, the client's browser may send out request to retrieve an image, which in this case is a CAPTCHA, at step 430. The server side code may create a new CAPTCHA, for example, with a random challenge, and may store the CAPTCHA solution in the HTTP session at step 435. Generation of the test image is described in greater detail below, for example, in the text accompanying FIGS. 7-15

The CAPTCHA image may then be sent to the browser, and is then displayed by the browser at step 440. A user may, via the client 405, fill in the form fields, provides solution to the CAPTCHA and hits "Submit" to send a user response to the server 410 at step 445. The browser sends CAPTCHA solution along with form fields for verification. The server side code may retrieve the previously-stored CAPTCHA solution from the HTTP Session, and verifies the stored CAPTCHA solution against the solution provided by the client at step 450. If verification is successful, client is sent to next logical step in the registration process at step 455. If not, the client may be redirected to the register page with an error message. The verification process is discussed in greater detail below, for example, in the discussion accompanying FIG. 16.

Figure 5:
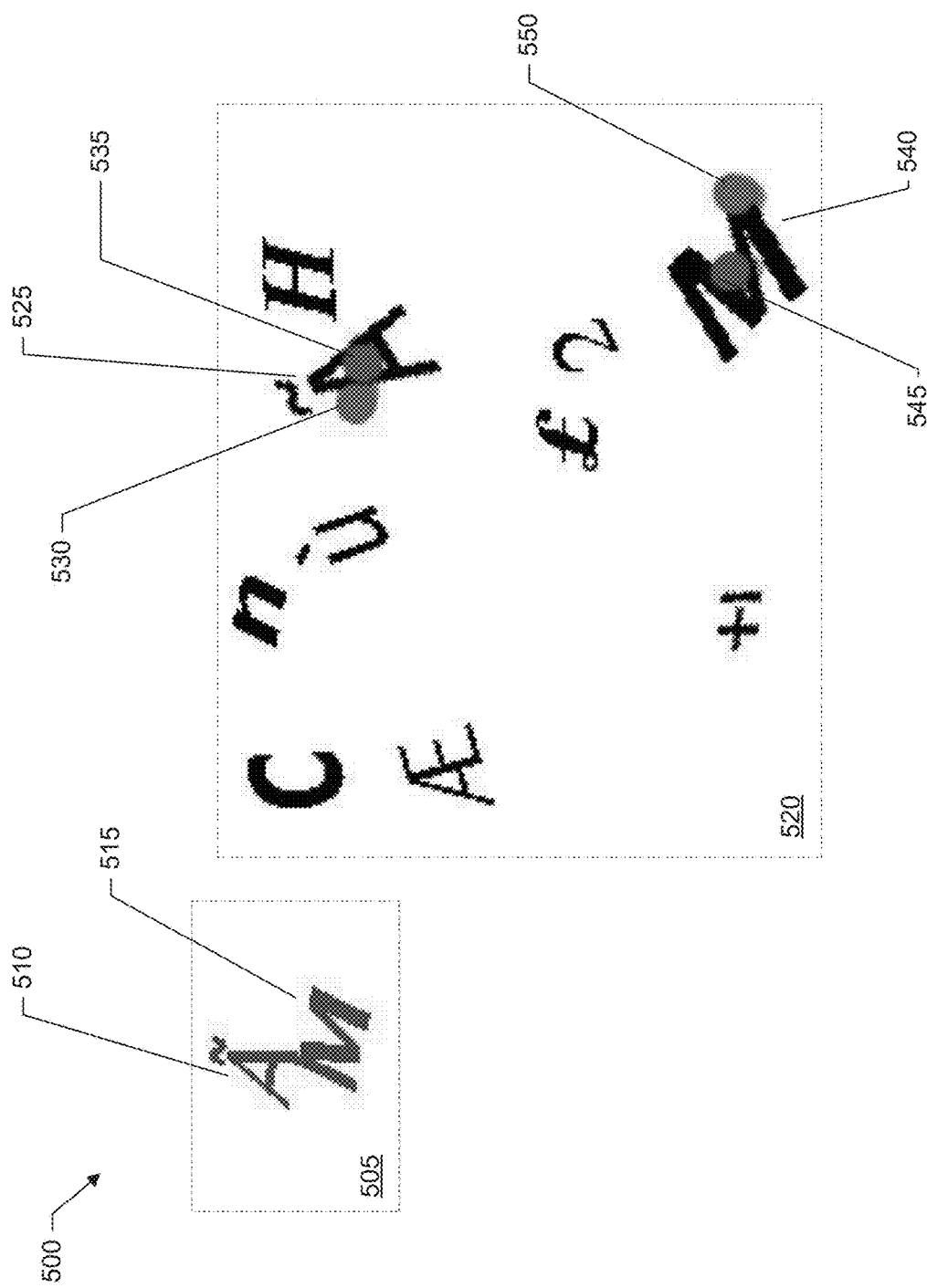
FIG. 5 is an exemplary embodiment of a generated image used for testing to tell computers and humans apart.

FIG. 5 is an exemplary embodiment of a generated image 500 used for testing to tell computers and humans apart. Image 500 displays two challenge characters 510 and 515 within the challenge region 505 and ten response characters within the response region 520. In some embodiments, the challenge characters may be a different color or shade from the response characters, to prevent confusion among users. The ten response characters include the solution to the challenge, the solution being the challenge characters within the response region 520, indicated by reference numbers 525 and 540. The remaining eight characters may be randomly selected characters from the challenge character set.

To solve the CAPTCHA presented in image 500, a user would need to provide a user response that identifies the challenge characters within the response region and select the challenge characters within the response region. In the interface 500, the dots 535 and 545 on the response characters 525 and 540 respectively indicate the actual solution coordinates and the dots 530 and 550 correspond to exemplary user selections. The selections may be made using any suitable input device (e.g., using a mouse, a touch screen input, etc.). The x and y coordinates for each user selection 530 and 550 make up the user response, which may be submitted to a server for validation. The server may compute the sum of minimum distance between the correct solution coordinates (i.e. the coordinates for dots 535 and 545) and the ones submitted by the user (e.g. the coordinates for dots 530 and 550). In the current example, the server may compute the two distances between points 530 and 535 and the dots 550 and 545. The server may then sum the distances to arrive at a total distance/deviation from the coordinates of the solution characters. This deviation then will be compared against a pre-computed threshold for a given CAPTCHA to make a decision. The comparison threshold is different for each CAPTCHA and is calculated during the CAPTCHA generation process. It should be noted that the validation process is different between an ordered solution and an unordered solution, which is an option that may be preselected based on a web site operator's preference. The differences are further highlighted below, in the discussion of FIG. 16.

Figure 6:
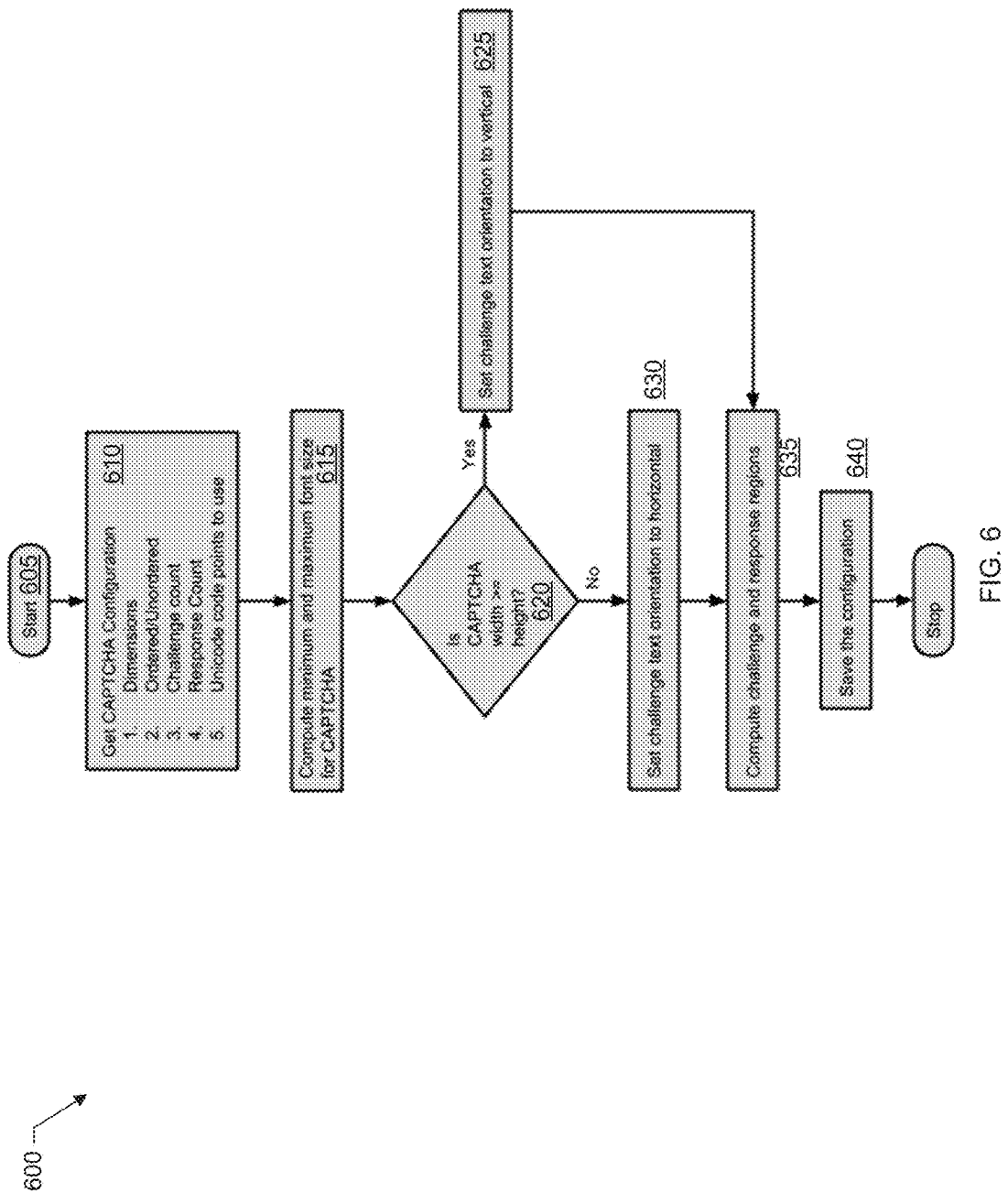
FIG. 6 illustrates an exemplary flow for initializing an engine for generating tests to tell computers and humans apart.

FIG. 6 illustrates an exemplary flow of a process 600 for initializing an engine for generating tests to tell computers and humans apart. After the initialization is complete, CAPTCHA generation and validation can be performed. After the initialization is started at step 605, the CAPTCHA test configuration is obtained at step 610. The obtaining the test configuration may include obtaining the dimensions of the display that the test will be displayed, whether or not the solution will be ordered or unordered, the count for the challenge (number of characters), the count for the response, and the Unicode points to use for obtaining the challenge and response. At step 615, the parameters obtained at step 610 are used to determine the minimum and maximum font size for the characters in the test. The minimum font size is computed as follows. For a given CAPTCHA image having a size defined as (width, height), the smaller dimension (e.g., 'S') of the two may be identified. From the smaller CAPTCHA dimension, the font sizes may be defined as, for example: minimum font size is (S/10), maximum font size is (S/5). While other definitions of the minimum and maximum font sizes may be used, the exemplary definitions may advantageously limit the CAPTCHA image's area consumed by the text to be less than 30% of the full area, with an average font size of S/7.5 per character, which may make it easier for a human user to identify individual characters.

The orientation of the test to tell computers and humans apart may be determined at step 620. The orientation may be varied to improve functionality by tailoring the test image to the display of the requesting client device. The test's orientation may be set automatically by the server in some embodiments, in response to receiving the dimensions of the display as part of the request for the image. If the requesting client's display has a width is greater than or equal to its height, then the challenge text orientation may automatically be set to a vertical orientation at step 630. If the height is greater than the width of the display (e.g., for a mobile computing device, such as a smart phone or a tablet), then the challenge text orientation is automatically set to a horizontal orientation at step 625. At step 635, the challenge and response regions are computed (as discussed further below). The orientation of the test and the region configurations are saved (e.g., at the server) at step 640.

While the method of FIG. 6 describes instantiating a single test/CAPTCHA configuration in response to receiving a request for an image, it may be desirable for an application using the described test to tell computers and humans apart to provide different tests for different devices (e.g., different tests for mobile devices and desktop computing devices). Accordingly, in some embodiments, the server may instantiate two test configurations (one with a vertical orientation and one with a horizontal configuration) during initialization, in response to receiving a request from a client. After instantiating the tests, the server may receive the display dimensions of the client device from the client's browser agent. Using the same logic as described in FIG. 6, the server may then return the appropriate test automatically in response to the determination of which dimension of the client's display is largest.

Figure 7:
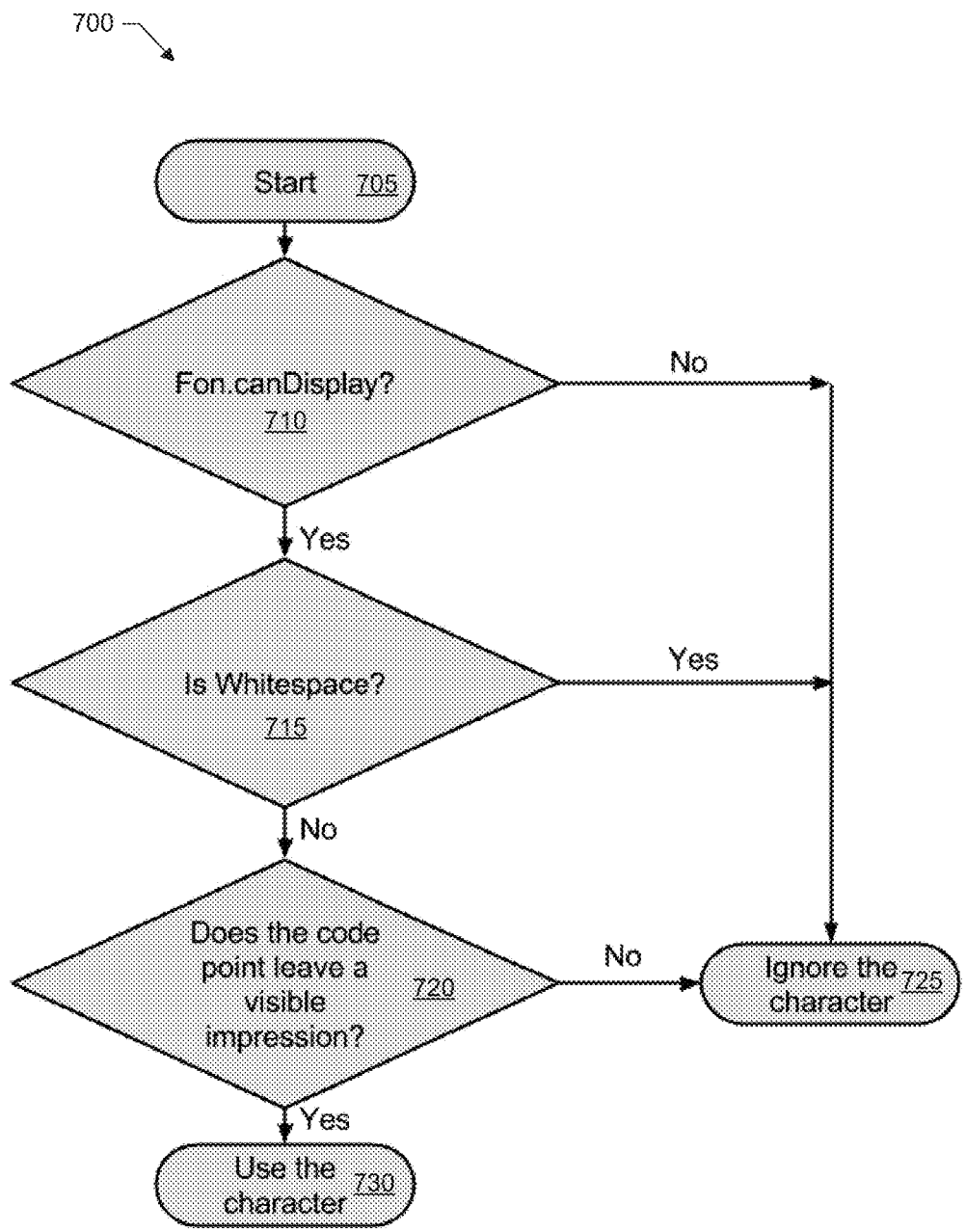
FIG. 7 is an operational flow diagram illustrating an exemplary process for testing characters from a selected range of characters to identify printable characters.

FIG. 7 is an operational flow diagram illustrating an exemplary process 700 for testing characters from a selected range of characters to identify printable characters. Since the described tests for telling computers and humans apart relies on character correlation in order to be solved, it is very important that the characters leave a distinct impression on the generated images. To be able to visually represent the various characters for correlation on the CAPTCHA image, the challenge and response Unicode code points cannot correspond to characters that are whitespaces, and the font used to draw those must have valid glyphs (i.e., a visual representation corresponding to the code point) for each of the chosen Unicode code points.

For example, when the 0 to 255 Unicode code point range is used without exclusions, a number of generated CAPT-CHAs may have missing characters. Further analysis may indicate that Unicode code points 0 through 32 does not leave any visible imprints on the CAPTCHA images for several logical fonts. To ensure that the generated CAPT-CHAs have visible and distinct characters, the following checks (shown in FIG. 7) may be applied for each logical Font to each code point for all the characters in the Unicode plane 0 to identify those characters. For a given code point in the selected range, the server determines if the font includes a glyph that corresponds to the code point at step 710. If this test is passed, then the server determines if the glyph is a whitespace at step 715. Any suitable test may be used to determine if the glyph is a whitespace, including a simple test to see whether the glyph includes any black pixels.

If the glyph is not a whitespace, the server determines if the code point leaves a visible impression at step 720. To determine if the glyph leaves a visible impression, the server generates an image with white background (RGB value of 255,255,255) and black font color (RGB value of 0,0,0) for the glyph. The server may then compute the number of black pixels in the image. If the computed number is more than a threshold of, for example, 2 (this value can be changed to any suitable value), the test is considered passed. If all three tests are passed, then the code point may be used to select characters for the challenge and response, as described above at step 730. If any of the tests are not passed, then the code point and the associated character are ignored at step 725.

Figure 8:
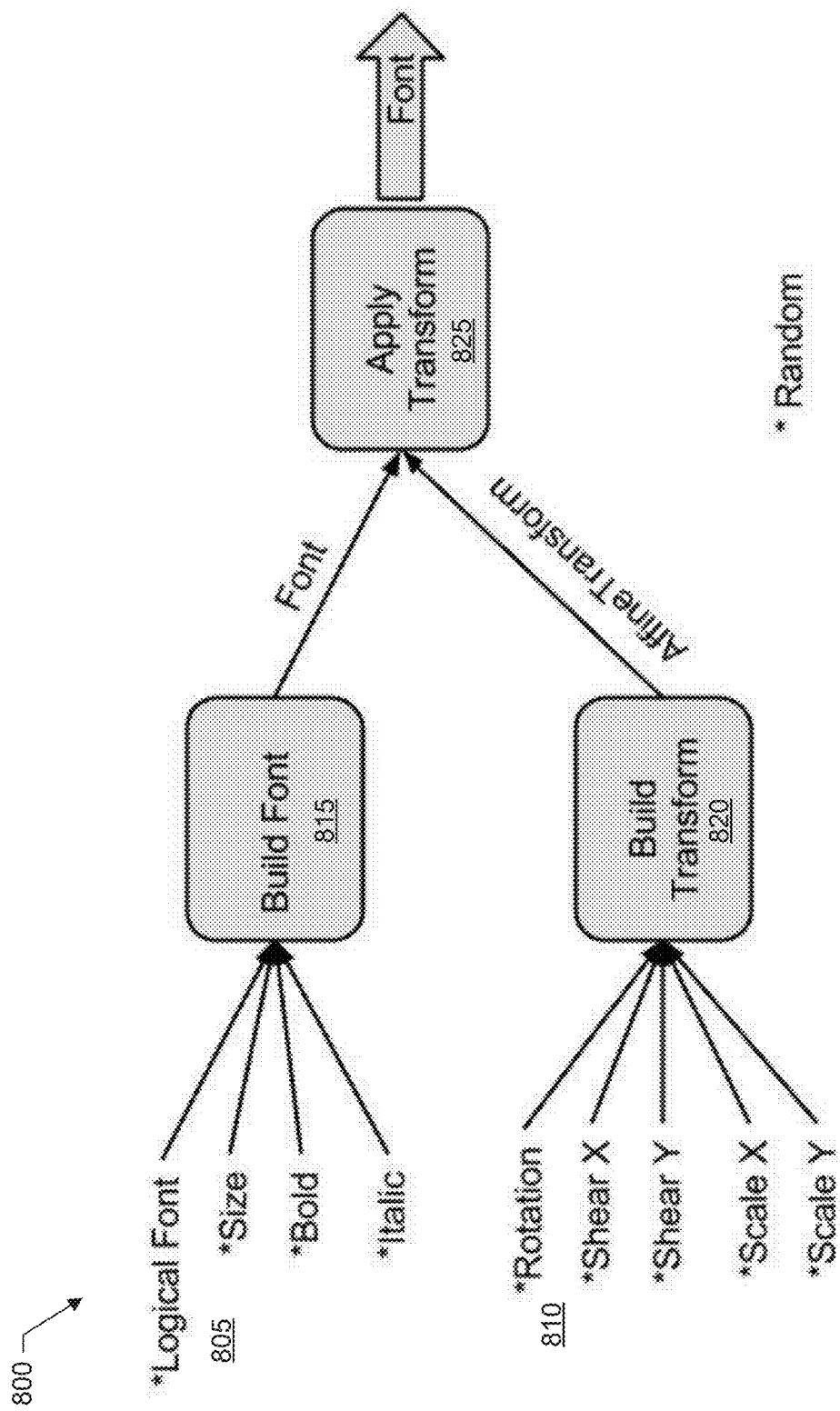
FIG. 8 is an operational flow diagram illustrating an exemplary process for building a random font for a selected character.

FIG. 8 is an operational flow diagram illustrating an exemplary process 800 for building a random font for a selected character. Randomly generated Fonts may be used for each CAPTCHA character to augment the character correlation/classification complexity. A random logical Font is selected at step 805. The selected font may be received by the server and stored by the server. In an exemplary embodiment, the logical font is selected from the following: a. Font.SANS SERIF; b. Font. SERIF; c. Font. DIALOG; d. Font.DIALOG INPUT; and e. Font. MONOSPACED. Next, random values may be selected for the following attributes: a. Size, b. Bold (boolean), and c. Italic (boolean). At step 815, a font may be constructed from the values in step 1 and 2 for use in generating the challenge and response of the image.

Constructing the font may further include choosing random values for the following in some embodiments, as shown in step 810: a. Font size scale multipliers for X and Y-axis (two separate values); b. Rotation in degrees (positive or negative); and c. Shear values for X and Y-axis (two separate values). To aid text readability and identification in the test, the absolute shear values may be restricted to be less than 0.5 in an exemplary embodiment. The random scaling, rotation and shear parameters may be used to construct an AffineTransform at step 820 to be applied to the selected character.

At step 825, the AffineTransform built at step 820 may be applied to the Font constructed in step 815 to get a new Font, which is then used for drawing a character on the CAPT-CHA image.

Figure 9A:
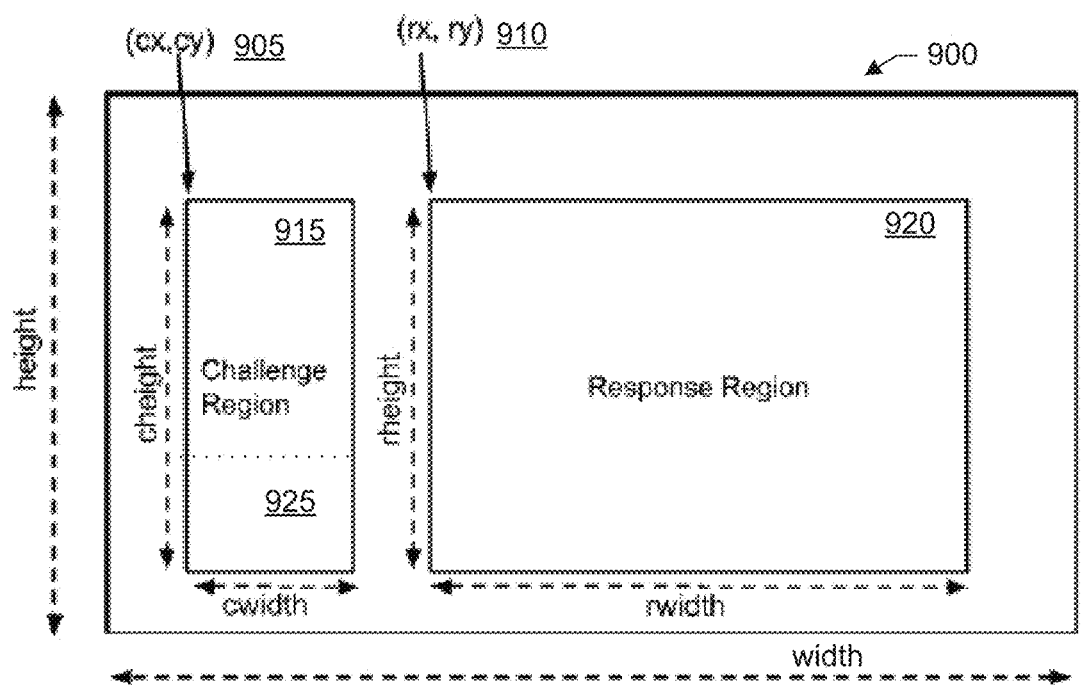
FIGS. 9A and 9B illustrate challenge and response regions of horizontal and vertical tests to tell computers and humans apart respectively.
Figure 9B:
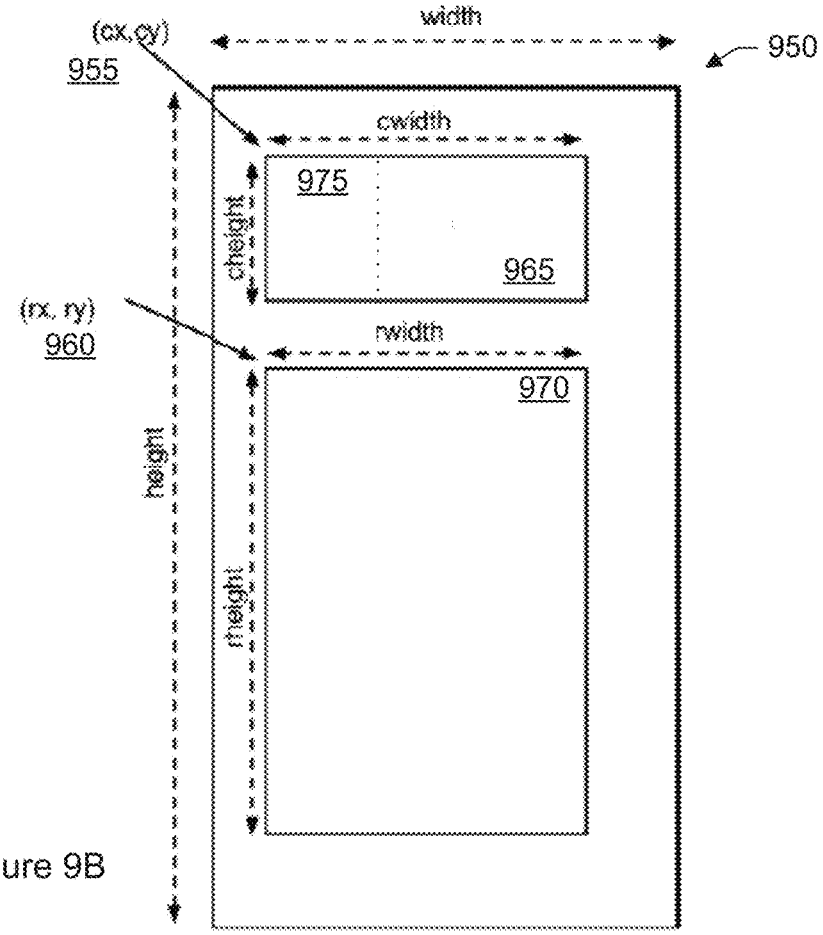

FIGS. 9A and 9B illustrate challenge and response regions of horizontal and vertical tests to tell computers and humans apart respectively. One of the important steps during CAPTCHA generation process is to compute the first random coordinate for writing the first challenge character. For example, if the first coordinate to write the horizontal challenge character is far too right, the text will be written beyond the image boundary and CAPTCHA will miss challenge characters to negatively impact user experience. To ensure that this does not happen, a similar mechanism is followed for horizontal and vertical CAPTCHAs.

Consider the following challenge region 915: cx may be a starting x coordinate of the challenge region and cy may be the starting y coordinate of the challenge region 915. cwidth may be the width of the challenge region 915 and cheight may be the height of the challenge region 915. The challenge_count may be the number of challenges as determined in the CAPTCHA configuration process described above.

Several factors are considered in determining the challenge and response regions of horizontal CAPTCHA 9A. First, since all the characters that are drawn on the CAPT-CHA are randomly rotated in clockwise or counter clockwise direction, the challenge region has an empty area to its left to prevent counter-clockwise rotated characters from being chopped off from the left. The height of the blank space above the challenge and response regions is set to a multiplier of the maximum font size to ensure that the characters written to the top of the challenge or response regions do not get chopped off from above even if they have the maximum permissible font size. The area between the challenge and response regions ensures that the challenge and response character do not get mixed up. The height of the blank space beneath challenge and response regions is set to a fractional multiplier of maximum font size to ensure that even if the character written to the bottom of the challenge or response regions is rotated to maximum permissible degrees, it does not get chopped off from the bottom. The blank space to the right of the response region ensures that the response characters do not get chopped off from the right end. This blank space is also computed as a fractional multiplier of the maximum permissible font size.

The challenge region 915 and response region 920 are used to pick random coordinates to draw challenge and response characters. The coordinates inside these regions are used to draw the CAPTCHA character(s). These regions are not required to contain the entire text, but they must contain all the coordinates where the text is drawn. The challenge and response regions are separated to avoid mixing of challenge and response text of the CAPTCHA. The two regions for drawing horizontal CAPTCHA characters are computed as follows. The MULTIPLIER value may be a constant with value between 0.75 and 0.9. The minimum font size variable min_font_size may correspond to the minimum permissible font for the CAPTCHA characters. The maximum font size variable max_font_size may correspond to the maximum permissible font for CAPTCHA characters. The width variable may correspond to the CAPT-CHA image width and the height variable may correspond to the CAPTCHA image height. The challenge region 915 may start at (cx, cy) 905 and have dimensions of (cwidth*cheight). The challenge region 915 dimensions may be computed as follows:

$$cx = 0.25 * \text{max\_font\_size}$$

$$cy = \text{max\_font\_size}$$

$$c\text{width} = \text{MULTIPLIER} * \text{max\_font\_size}$$

$$c\text{height} = \text{height} - cy - 0.25 * \text{max\_font\_size}.$$

The response region 920 may start at (rx, ry) 910 and have dimensions of (rwidth*rheight). The response region 920 dimensions may be computed as follows:

$$rx = 2.25 * \text{max\_font\_size}$$

$$ry = \text{max\_font\_size}$$

$$r\text{width} = \text{width} - rx - \text{max\_font\_size}$$

$$r\text{height} = \text{height} - ry - 0.25 * \text{max\_font\_size}.$$

To calculate the coordinates of the first character of a vertical challenge text (horizontal CAPTCHA 9A), random coordinates (rx, ry) may be selected from the following rectangle for the first challenge character:

Rectangle(cx,cy+cheight((challenge_count−1)/challenge_count),cwidth,cheight/challenge_count).

The cheight((challenge_count−1) component added to cy may keep the random coordinates (rx, ry) towards the bottom of the challenge region. This may be needed because the last challenge character of the vertical challenge text is, in some embodiments, drawn first at the bottom of the challenge region, and the remaining vertical challenge characters may be drawn upwards until the first challenge character is drawn last. Adding a component to the cy value may help ensure that the first challenge character does over overflow from the top of the CAPTCHA image area. For example, when the number of challenge characters is 3, the coordinates for the first challenge coordinates may be restricted to sub-region 925 towards the bottom of the challenge region 915, with height of cheight/3 (which is equal to cheight/challenge_count). By keeping the last challenge character (which may be drawn first) in sub-region 925, the described method for identifying coordinates helps ensure all of the challenge text will be towards the center of the challenge region 915. This may make it easier for the user to identify the challenge characters.

The challenge and response regions for vertical CAPTCHA test image may be computed in a fashion similar to the horizontal CAPTCHA test image, described above. Several factors are considered in determining the challenge and response regions of vertical CAPTCHA 9B. First, the height of the blank space above the challenge region is set to the maximum font size to ensure that the characters written to the top of the challenge region do not get chopped off from above even if they have the maximum permissible font size. Also, since all the characters that are drawn on the CAPTCHA are randomly rotated in clockwise or counter clockwise direction, the challenge and response regions have an empty area to their left to prevent counter-clockwise rotated characters from being chopped off from the left. The height of the area between the challenge and response regions is a multiplier of the maximum font size to ensure that the challenge and response character do not get mixed up. The height of the blank space beneath the response region is set to a fractional multiplier of maximum font size to ensure that even if the character written to the bottom of the response region is rotated to maximum permissible degrees, it does not get chopped off from the bottom. The blank space to the right of the challenge and response regions ensures that the challenge and response characters do not get chopped off from the right end. This blank space is also computed as a fractional multiplier of the maximum permissible font size.

The computations for determining the challenge and response regions of a vertical CAPTCHA are described as follows, in an exemplary embodiment. The MULTIPLIER value may be a constant, set to 1.0 in the example of FIG. 9B. The minimum font size variable min_font_size may correspond to the minimum permissible font for the CAPTCHA characters. The maximum font size variable max_font_size may correspond to the maximum permissible font for CAPTCHA characters. The width variable may correspond to the CAPTCHA image width and the height variable may correspond to the CAPTCHA image height. The challenge region 965 may start at (cx, cy) 955 and has dimensions of (cwidth*cheight). The challenge region 965 dimensions may be computed as follows:

$$cx = 0.25 * \text{max\_font\_size}$$

$$cy = \text{max\_font\_size}$$

$$c\text{width} = \text{width} - cx - \text{max\_font\_size}$$

$$c\text{height} = \text{max\_font\_size} * \text{MULTIPLIER}.$$

The response region 970 may start at (rx, ry) 960 and have dimensions of (rwidth*rheight). The response region 970 dimensions may be computed as follows:

$$rx = 0.25 * \text{max\_font\_size}$$

$$ry = c\text{height} + cy + \text{max\_font\_size} * \text{MULTIPLIER}$$

$$r\text{width} = \text{width} - rx - \text{max\_font\_size}$$

$$r\text{height} = \text{height} - ry - 0.75 * \text{max\_font\_size}.$$

Accordingly, for horizontal challenge text (vertical CAPTCHA 9B), the random coordinates (rx, ry) for the first challenge character are selected from the following rectangle:

Rectangle(cx,cy,cwidth/challenge_count,cheight).

Exemplary computations to arrive at values for cwidth and cheight are discussed above. The exemplary challenge sub-region 975 rectangle computed here may advantageously keep the sub-region of the first challenge coordinates to the left side of the challenge area. This may help keep the challenge text to center of the CAPTCHA, making the challenge text easier to identify by the user. Additionally, using the described sub-region 975 may also, because the horizontal challenge text is drawn from left to right, help ensure that the last challenge character does over overflow from the right of the CAPTCHA area 950. For example, when the number of challenge characters is 3, the coordinates for the first challenge coordinates may be restricted to the left of the challenge region 975, with width of cwidth/3 (equal to cwidth/challenge_count).

The algorithm also computes per CAPTCHA maximum distance that is permissible for the solution to be considered valid. The solution may be computed as per the formula below:

$$\frac{m}{2}\sum_{i=0}^{n-1} Fi$$

In the formula above, Fi is the font size of the i$^{th}$ response character corresponding to a challenge character; n is the number of challenge characters; and m may be the general usability multiplier for maximum permissible accumulated distance between the actual clicks and expected center of the drawn response character. A recommended value is in the range 1.2 to 1.5.

Figure 10:
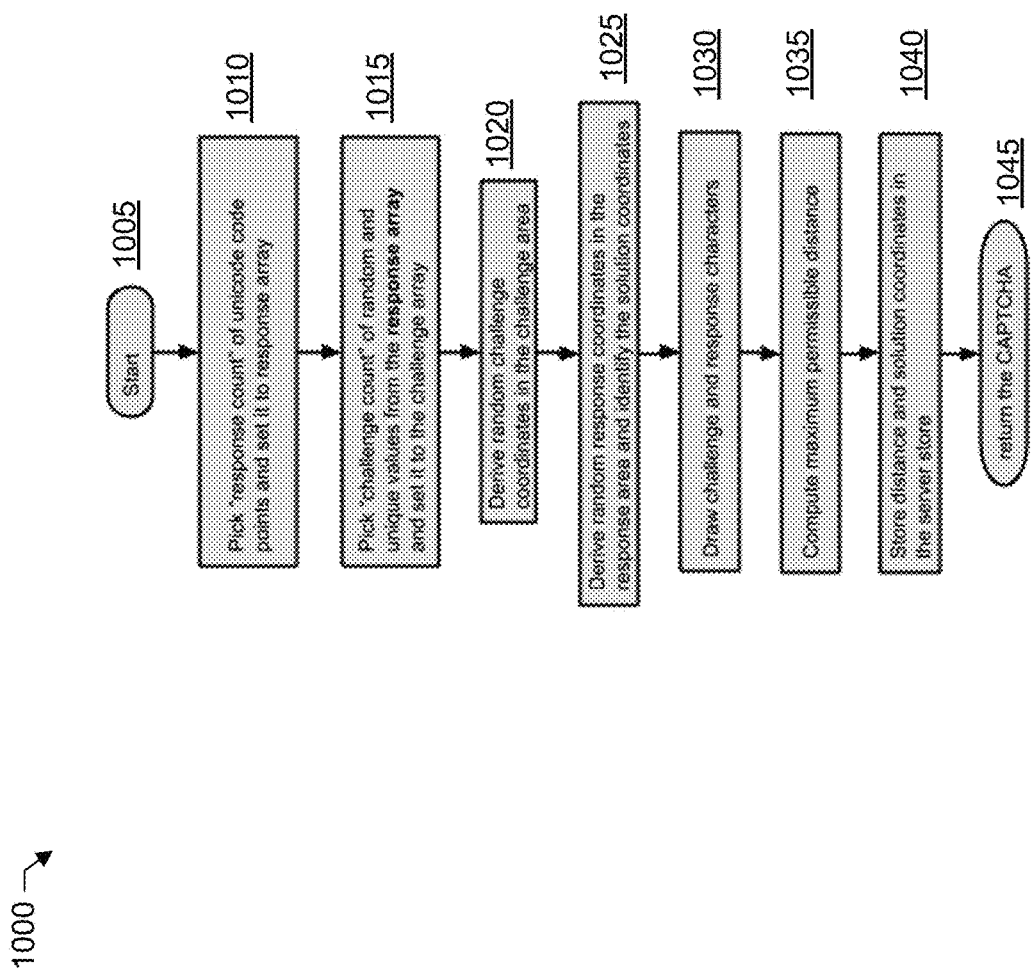
FIG. 10 illustrates a representative data flow for generating a test to tell computers and humans apart.

FIG. 10 illustrates a representative data flow 1000 for generating a test to tell computers and humans apart. The test is automatically generated without user intervention, by, for example, a server dedicated to generating and validating tests to tell computers and humans apart. In some embodiments, the test is generated in response to a request for an image, such as the CAPTCHA image from FIG. 5.

After the flow starts at step 1005, a response-count of Unicode code points, that includes characters from a selected range of Unicode characters, is selected and set to the response array at step 1010. The selected range may, for example, be a subset of Unicode plane 0 code points. In an exemplary embodiment, the selected range at least includes the 8-bit ASCII character range. Such a broad range of characters to select from may offer far greater security and flexibility compared to any alphabet, from which conventional CAPTCHA tests currently generate CAPTCHA images.

From the selected response array of code points, a challenge-count of code points may be selected and set to a challenge array at step 1015. The response count may be a variable corresponding to the number of response characters to be drawn. Likewise, the challenge count may be a variable corresponding to the number of challenge characters to be drawn. The response count is greater than the challenge count, since the response includes all of the characters in the challenge, as well as additional characters. The response array and the challenge array may be objects in memory corresponding to the response and challenge respectively. The response array and the challenge array may be implemented as collections, such as a "Set" class in Java®, developed by Oracle Corp, of Redwood City, Calif. As an illustrative example, eleven code points may be selected and set to the response array. From these eleven code points, three code points may be selected and set to the challenge array.

At step 1020, challenge x and y coordinates are derived in the challenge area for each of the characters in the challenge count. This derivation, which may be random in some embodiments, is further explained below. Likewise, at step 1025 response x and y coordinates are derived in the response area for each of the code points in the response array. Like the challenge coordinates, the response coordinates may be randomly assigned to the response code points. During the deriving of the response coordinates, the coordinates of the solution characters, response characters which correspond to the selected challenge characters, are identified.

At step 1030, an image including the challenge and response characters may be drawn by the server based on the derived coordinates of each character. At step 1035, the maximum permissible distance from the solution characters within the response is computed. An example of this calculation is detailed above, in the discussion of FIGS. 9A-9B. The maximum permissible distance and solution coordinates are stored in the server store at step 1040, and the drawn image, which may be a CAPTCHA in some embodiments, is returned to the requesting client at step 1045.

Figure 11:
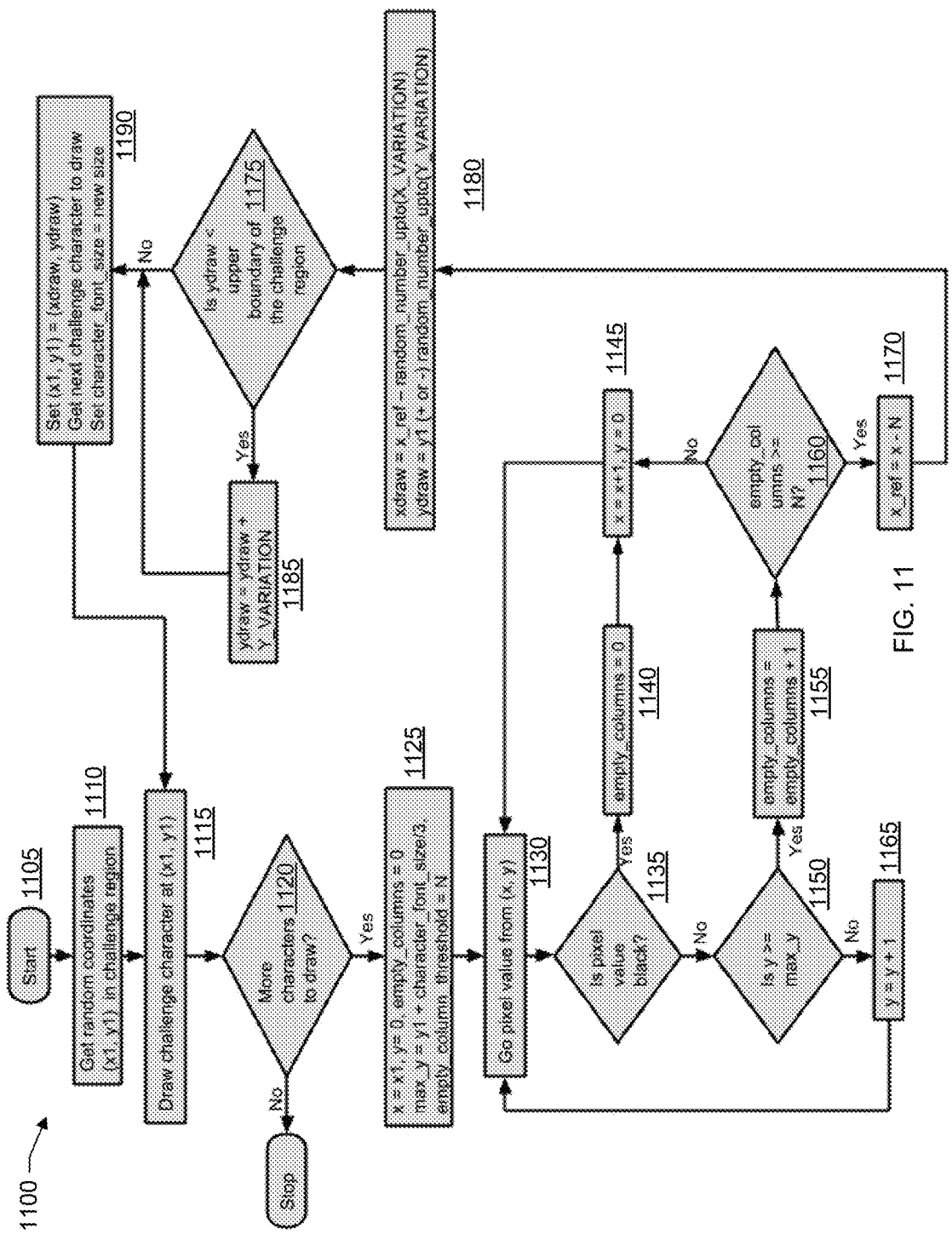
FIG. 11 illustrates an exemplary flow for providing overlap for characters in a horizontal challenge for an image used for testing to tell computers and humans apart.
Figure 12:
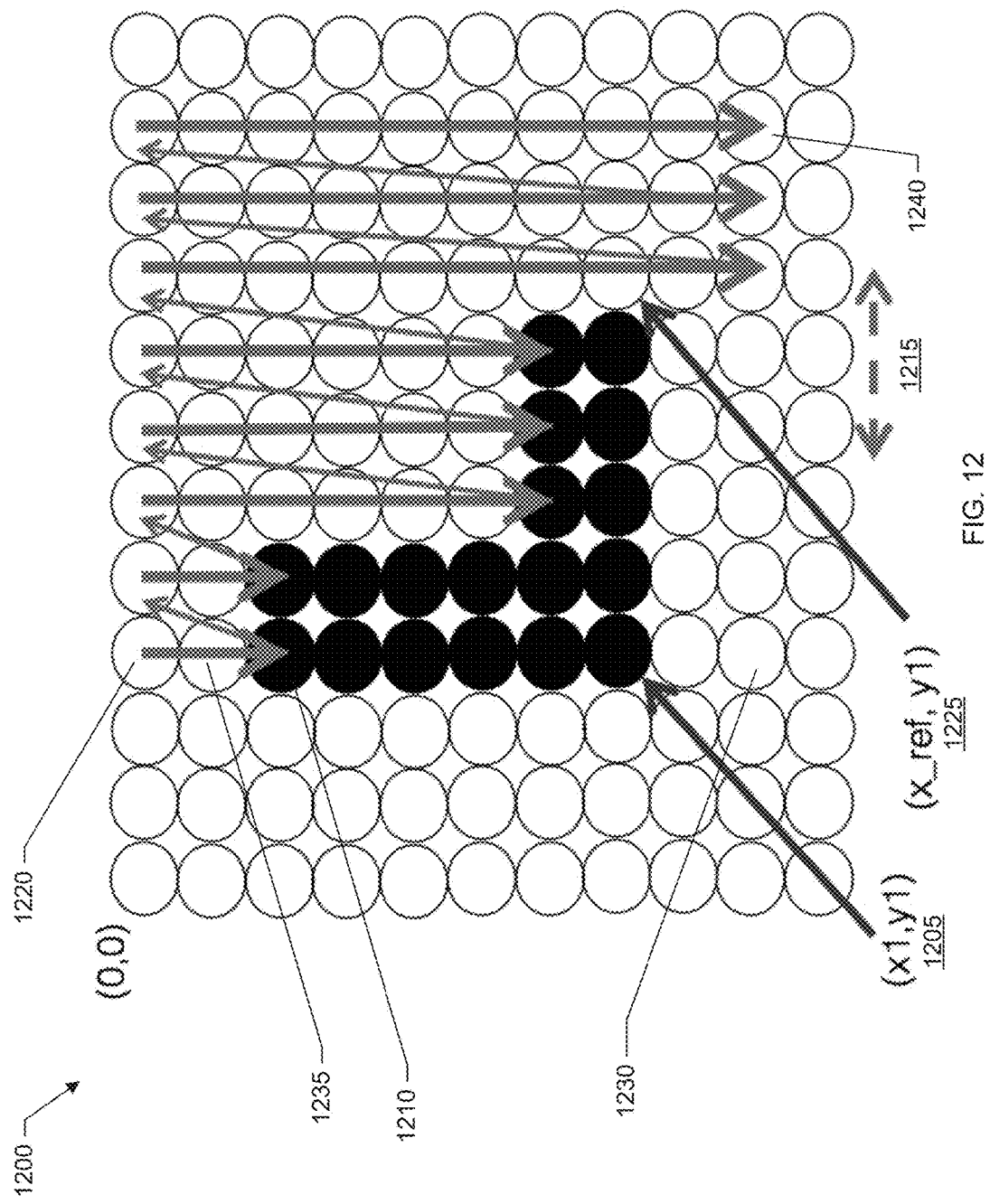
FIG. 12 illustrates scanning of an exemplary character in a horizontal challenge.

FIG. 11 illustrates an exemplary flow 1100 for providing overlap for characters in a horizontal challenge for an image used for testing to tell computers and humans apart. In the exemplary embodiment, the test is a CAPTCHA. FIG. 12 illustrates scanning of an exemplary character 1210 in a horizontal challenge. When drawing horizontal challenge text, the characters may be drawn from left to right, from first to last. To make it difficult for automated algorithms to segment individual characters, the CAPTCHA scheme may create random overlap between the individual characters. To help ensure that the response text does not interfere with the challenge text drawing process, the challenge text is drawn first on a blank CAPTCHA image. The image 1200 shows how the scanning process works for one challenge character. The flow 1100 shows the algorithm to draw all the CAPTCHA challenge characters with random overlap. Coordinates for a first character may be randomly assigned to be (x1, y1) (1205 in FIG. 12) at step 1110. The first character may be drawn at the randomly chosen coordinates 1205 within the challenge region at step 1115. An explanation of how the coordinates for the first character are computed may be found above, see FIGS. 9A-9B and accompanying text. For each subsequent character, it is determined whether or not all of the challenge characters have been drawn at step 1120. The scanning process is ended if all challenge characters have been drawn. If there are additional characters to be drawn, then process 1100 continues to find coordinates for the next character.

To scan the first challenge character, the server may inspect pixels of each column, starting with the pixel at coordinates (x1, 0) 1220 at the top of the challenge region, until the coordinates (x1, y1+(character_font_size/3)) 1230 are reached. At step 1125, variables x, max_y, empty_columns, and empty_column_threshold for the scan may be initialized. The y variable for the scan max_y may be set to y1+(character_font_size/3) for the maximum y coordinate that the pixel value may be checked. The character_font_size may be defined as the font size of the character that was drawn.

The scan starts at step 1130, where the x and y values for the first pixel are received. For the exemplary first challenge character of FIG. 12, the initial x and y values are x1 and 0. If the pixel value is black at step 1135 for the current coordinates, then the empty_columns value is maintained at zero at step 1140 and the x value is incremented by one at step 1145. An example of this may be seen at pixel 1210 in FIG. 12, the first black pixel in the column including the (x1, 0) coordinate. If the pixel value is not black, the flow proceeds to step 1150 where the algorithm checks if the current value y coordinate is greater than or equal to max_y. If the last row has not been reached, then the y value is incremented by one at step 1165 and the scan repeats for each row of the column. This may be seen at pixel 1220. Since pixel 1220 is white, the scan proceeds to the pixel in the next row in the column that includes the (x1, 0) coordinate, pixel 1235.

If the last row, where y>=max_y, in a column has been reached and no black pixels have been found at step 1150, the empty_columns variable is incremented by 1 at step 1155. The flow continues to step 1160, where the empty_columns variable is checked to see if it is greater than or equal to the empty_column_threshold N. The scan stops when 'N' successive column scans do not have any black pixels, and the flow moves to step 1170. If the empty_columns variable is less than the threshold, then the x-value is incremented by one at step 1145 and scan continues at step 1130.

Assuming the last scanned column index is x_stop, the stop coordinate of the scan may be set as (x_stop−N, y1) at step 1170, where x_ref=x_stop−N. For the example challenge character of FIG. 12, the scan continued until pixel 1240. If the threshold N was set to 2, for example, then the stop coordinate would be set as (x_ref, y1) 1225 in step 1170. Y value y1 may correspond to the y coordinate where the character was drawn. Once the reference coordinate 1225 is identified, the final coordinates of the next character may be calculated as shown in step 1180 to enforce random overlap. An exemplary formula for determining the coordinates of the next character may be as follows:

$$(x_{draw}, y_{draw}) = (x\_ref - random\_number\_upto (X\_VARIATION), y \cdot (random(+ \text{ or } -)) random\_number\_upto(Y\_VARIATION))$$

In the exemplary character shown in FIG. 12, X_VARIATION and Y_VARIATION were chosen to be 10. These values, however, may be set to any desired value. Subtracting a random value from the x coordinates may allow random overlap between successive characters, making segmentation difficult for automated software attempting to solve the CAPTCHA. This is displayed in FIG. 12 by range 1215, which illustrates that the x coordinate for the next character will be a random value between (x_ref−random_value_upto(X_VARIATION)) and x_ref. Adding or subtracting a random value in y coordinates likewise moves the character up or down and may also reduce predictability. At step 1175 a further check is performed, to make sure that the y coordinate of the next character is not outside of the challenge region. If ydraw is less than the upper boundary of the challenge region, then at step 1185 Y_VARIATION is added to ydraw, thereby moving ydraw downwards and into the challenge region enough so that the entire character may be drawn without going outside of the image dimensions. The same process is followed for each character at step 1190, with x1,y1 of the new character being set to $x_{draw}$ and $y_{draw}$. The ($x_{draw}$, $y_{draw}$) coordinates become the starting point for the next scan.

Figure 13:
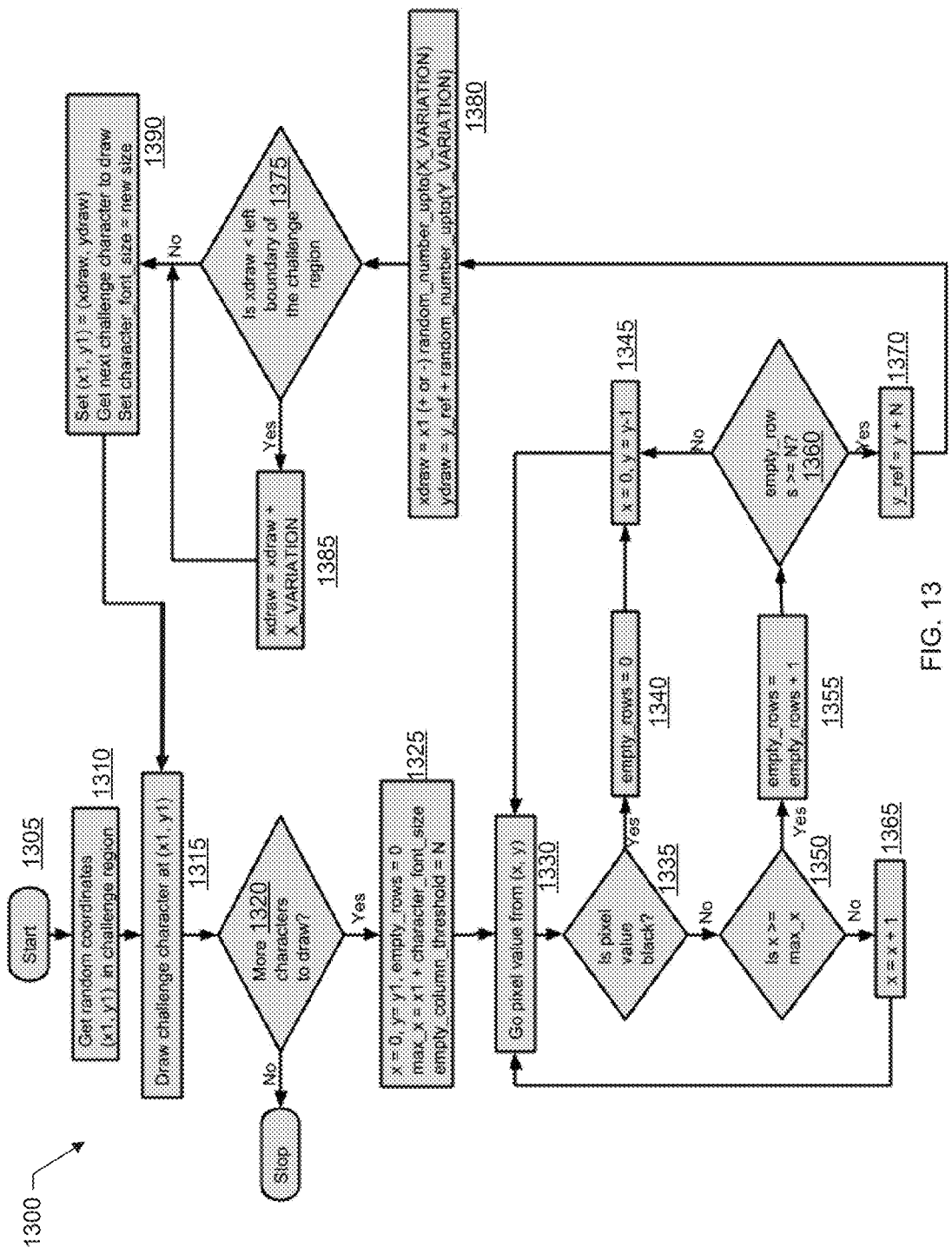
FIG. 13 illustrates an exemplary flow for providing overlap for characters in a vertical challenge for an image used for testing to tell computers and humans apart.
Figure 14:
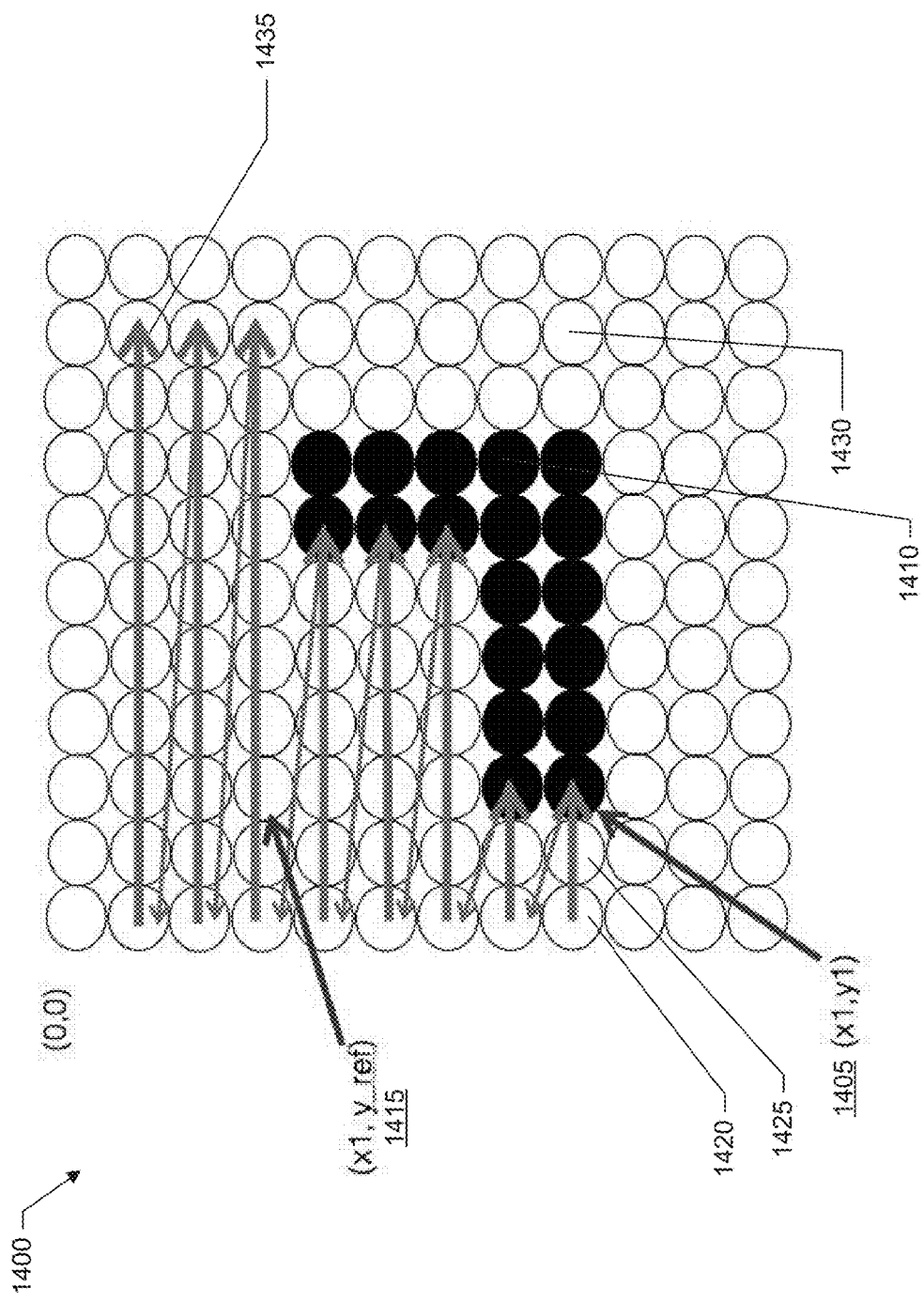
FIG. 14 illustrates scanning of an exemplary character in a vertical challenge.

FIG. 13 illustrates an exemplary flow 1300 for providing overlap for characters in a vertical challenge for an image used for testing to tell computers and humans apart. FIG. 14 illustrates scanning of an exemplary character 1410 in a vertical challenge. The algorithm to write vertical challenge for horizontal CAPTCHA is similar to horizontal challenge. However, there are several notable differences. First, the vertical challenge characters are written from last to first (i.e., from the bottom of the challenge region to the top. The first drawn challenge character (last character of the challenge) is written at the bottom, the next one above that and henceforth. Second, the scan for rows with no white pixels is performed from bottom to top, and may be performed left to right, as shown in image 1400. This is shown in the flow 1300, as at step 1325 the scan starts on the lowest row y1 that the character has been drawn in, at the zero coordinate of the x-axis (e.g., pixel 1420). The image 1400 shows the process of scanning one character to identify 'y' coordinates to draw next challenge character.

Otherwise, the flow 1300 is similar to flow 1100 of FIG. 11. If the pixel value is black at step 1335, then the empty_rows value is maintained at zero at step 1340 and the y value is incremented by one at step 1345 (see, e.g., pixel 1405). If the pixel value is not black at step 1335, the flow then proceeds to step 1350, where the server determines if the max_x pixel of the row has been reached. If the last pixel has not been reached, then the x value is incremented by one at step 1365 (see, e.g., pixels 1420 and 1425).

If the last pixel of the row has been reached at step 1350, then the empty_rows variable is incremented by one at step 1355. The server then determines if the empty_rows value is equal to or greater than the N threshold value at step 1360. If the empty_rows value is still less than the N threshold value, then the y value is decremented by one at step 1345 and the scanning continues in the next row at step 1330.

From the stop coordinate, reference coordinates (x1, y_ref) 1415 may be calculated. Reference coordinates 1415 may be derived from the y_stop y coordinate of las-scanned pixel 1435, similarly to the x_ref coordinate calculated above. X value x1 may correspond to the x coordinate where the initial challenge character was drawn. Once the reference coordinate is identified, the final coordinates of the next character are calculated as shown in step 1380 to enforce random overlap (e.g., using the formula shown). A similar check for the left boundary of the challenge region is performed at step 1375, and once the $x_{draw}$ and $y_{draw}$ coordinates have been set, the next challenge character is loaded by the server at step 1390.

Figure 15:
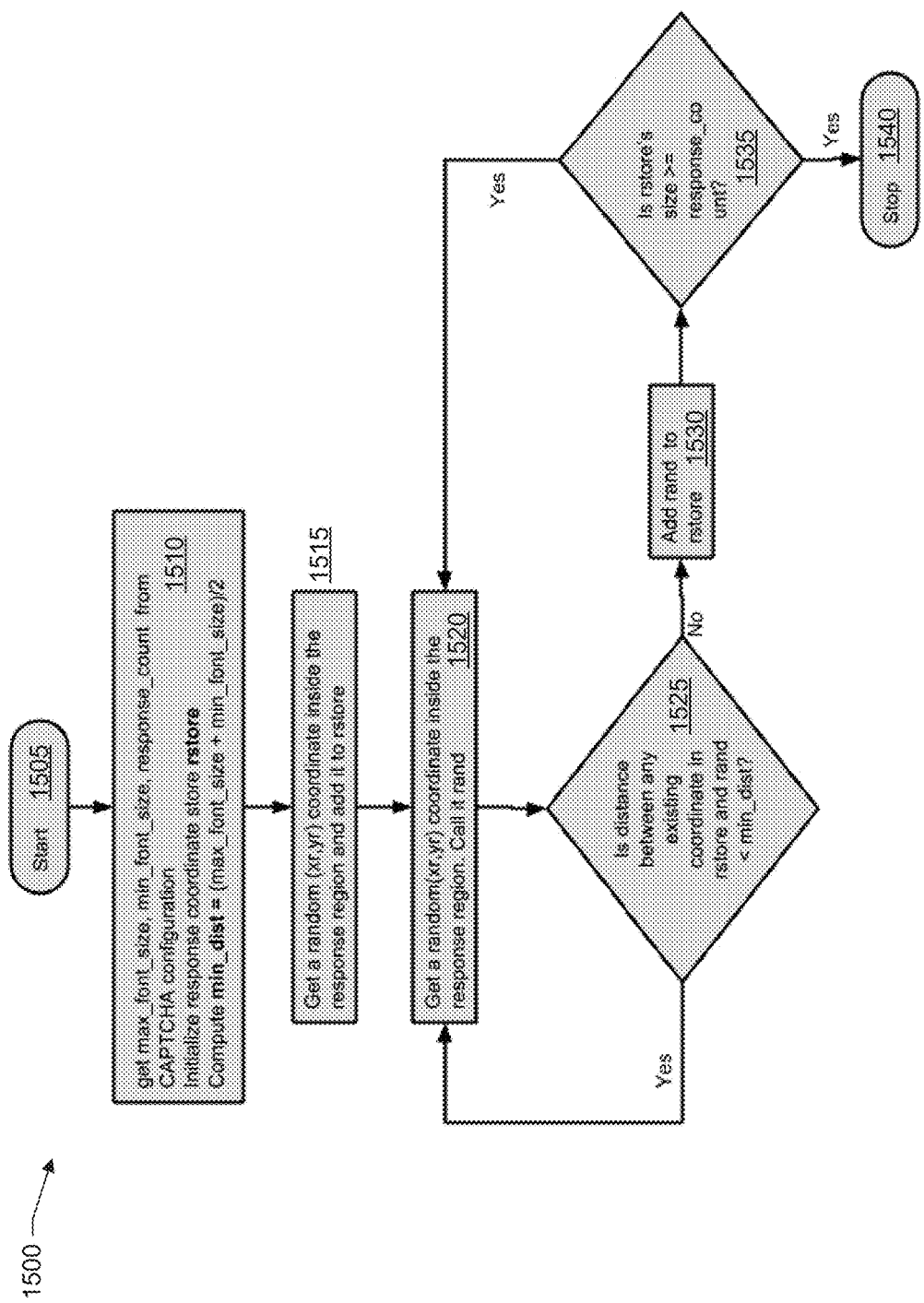
FIG. 15 illustrates an exemplary flow for determining coordinates of a response for an image used for testing to tell computers and humans apart.

FIG. 15 illustrates an exemplary flow for a process 1500 for determining coordinates of a response for an image used for testing to tell computers and humans apart. To ensure better CAPTCHA usability, the CAPTCHA generation algorithm tries to space out the response characters. Unlike the challenge text drawing process, where the aim is to have random overlaps between challenge characters to make character segmentation difficult, the goal while drawing response characters is to avoid the overlap. The parameters of the test initialization, determined, for example, by the initialization process shown in FIG. 9, are retrieved and the minimum distance between characters is determined at step 1510. A first random set of x and y coordinates for a first character inside the response region are selected at step 1515. A second random set of x and y coordinates for a second character inside the response region are selected at step 1520.

During the process of generating random coordinates inside the response region, the algorithm computes the distance between the newly generated random coordinates and all of the existing coordinates at step 1525. If distance of the new coordinates from any of the existing coordinates is less than a threshold, which may be defined as the variable min_dist, it is rejected and a different set of coordinates is selected at step 1520. If not, the newly generated coordinate is added to the store at step 1530. The process is iteratively repeated at step 1535 until the number of random coordinates inside the response store is equal to the response count required as per the CAPTCHA configuration at step 1540.

Figure 16:
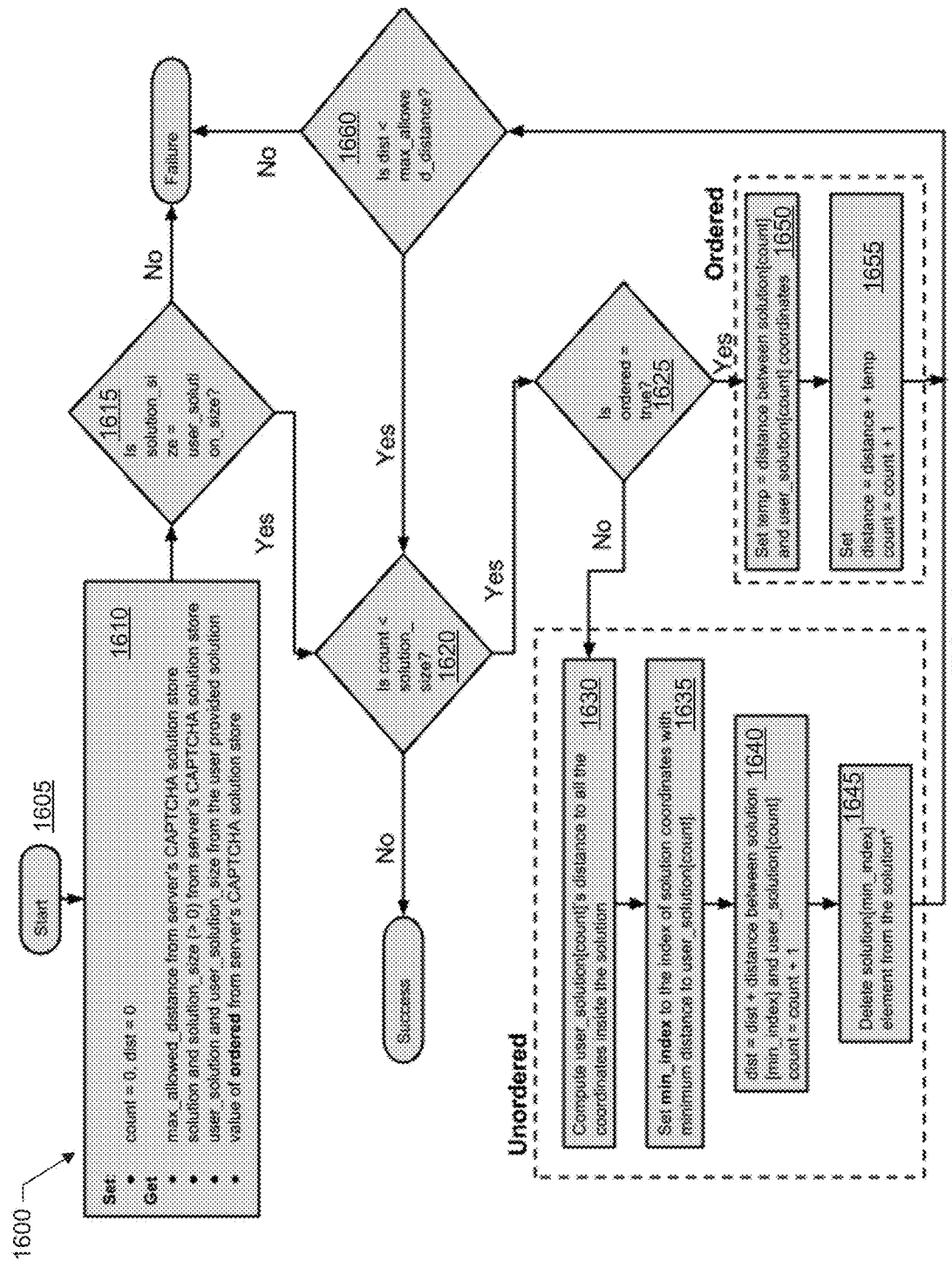
FIG. 16 illustrates a representative data flow for validating the result of a test to tell computers and humans apart.

FIG. 16 illustrates a representative data flow 1600 for validating the result of a test to tell computers and humans apart. Once a user submits CAPTCHA solution to the server, the server may retrieve the CAPTCHA solution from its solution store and validate the user response, either in ordered or unordered fashion based on the selected configuration. The flow 1600 contains the process for both ordered and unordered validation. ACAPTCHA may be validated either as ordered or unordered, but not as both. That is, the value of the ordered parameter does not change for a given CAPTCHA, and furthermore a CAPTCHA solution expires after single validation for enhanced security in order to prevent CAPTCHA solution replay attacks. That is, if the user response fails the validation process, the entire CAPTCHA generation process is repeated.

At step 1610, the count (corresponding to the number of the coordinate pairs compared in the algorithm) and distance (corresponding to the total distance between the user selections and the stored solution coordinates) variables are initialized at zero and the maximum allowed distance from the stored CAPTCHA solution and solution size (i.e., number of characters in the solution) are retrieved from the server's CAPTCHA solution data store. The user solution coordinates and the user solution size (number of selections by the user) are retrieved from the user response as well. At step 1615, a preliminary check is made by comparing the user solution size and the stored solution size. If the solution sizes are not equal, then no further steps are taken in the validation process and validation fails. If the solution sizes are equal (the number of coordinates in both the user solution and the stored solution are the same) the flow proceeds to step 1620. At step 1620, if the value of count variable is less than the solution size, the test proceeds to step 1625. The CAPTCHA configuration ensures that the solution_size is a non-zero number and the first check at step 1620 may always goes to step 1625. At step 1625, the server determines if the stored solution is ordered or not. If the stored solution is ordered, then the first character in the ordered solution is compared to the first user selection at step 1650 and the distance between the two (based on the x and y coordinates of each) is added to the total distance variable and count is incremented at step 1655. At step 1660 the total distance variable is compared to the retrieved maximum distance (i.e. the threshold distance for the CAPTCHA), and validation fails if the total distance variable exceeds the retrieved maximum distance.

If the stored solution is unordered, then at step 1630, the user selection is compared to the coordinates of each response character corresponding to a challenge character in the response region. At step 1635 the minimum index variable is set to equal the distance between the closest response character to the user selection. At step 1640, the distance between the closest response character and the user selection is added to the total distance variable, for comparison to the max allowed distance at step 1660. At step 1645, the response character closest to the user selection is deleted from the response, to prevent a user from selecting multiple times near a response character to trick the server into validating the user response.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of testing to tell computers and humans apart, the method comprising:
providing, by a processor, a challenge on an interface, the challenge comprising a number of selected characters from a challenge character subset, the challenge character subset comprising characters from the 8-bit ASCII character range that leave a visible impression;
providing, by the processor, a response on the interface, the response comprising a plurality of characters from the challenge character subset, the response having a character count that is greater than the number of challenge characters and the response including the characters in the challenge, each character in the response having a font size selected from a range having a predetermined maximum, a predetermined orientation, and an x coordinate and a y coordinate, the challenge and the response together forming an image, the image being provided in response to a user request;
receiving, by an input device in communication with the processor, a plurality of user selections of locations in the interface, each user selection being associated with an x coordinate and y coordinate;
transmitting, by the processor, the x coordinate and the y coordinate of each selection to a server, wherein the server:
compares the x coordinate and the y coordinate of each user selection with x and y coordinates for a subset of the plurality of characters in the response to obtain a distance value for each user selection;
sums the distance values for each user selection to obtain a total distance value; and
compares the total distance to a predetermined threshold, the server validating the user response when the total distance is less than the predetermined threshold, the validating comprising providing access to web content specified in the user request.

2. The method of claim 1, wherein each character in the challenge and the response has a independently-determined font, size and orientation.

3. The method of claim 1, wherein the image has a vertical orientation.

4. The method of claim 1, wherein the image has a horizontal orientation.

5. The method of claim 1, wherein the characters in the challenge are a different color from the corresponding characters in the response.

6. The method of claim 1, the comparing the x coordinate and the y coordinate of each user selection further comprising:
comparing the x coordinate and the y coordinate of each user selection with the x and y coordinates of each of the plurality of characters in the response; and
associating each user selection with a character in the response with a minimum distance from the user selection, the total distance value equaling the sum of the distances between each user selection and the associated character in the response with the minimum distance from the user selection.

7. The method of claim 1, the server further storing a solution comprising an ordered list of coordinates for the characters in the challenge included in the response, the comparing the x coordinate and the y coordinate of each user selection comprising comparing the user selections in chronological order with corresponding x and y coordinates of the ordered list stored in the solution, the total distance value equaling the sum of the distances between each user selection and the corresponding x and y coordinates of the ordered list.

8. A system for generating an image for use in a test to tell computers and humans apart comprising:
a web server, the web server receiving a request for an image from a client device; and a test server, the test server being configured to:
provide a challenge on an interface, the challenge comprising a number of selected characters from a challenge character subset, the challenge character subset comprising characters from the 8-bit ASCII character range that leave a visible impression;
provide a response on the interface, the response comprising a plurality of characters from the challenge character subset, the response having a character count that is greater than the number of challenge characters and the response including the characters in the challenge, each character in the response having a font size selected from a range having a predetermined maximum, a predetermined orientation, and an x coordinate and a y coordinate, the challenge and the response together forming an image, the image being provided in response to a user request;
receive, by the web server, a plurality of user selections of locations in the interface, each user selection being associated with an x coordinate and y coordinate;
compare the x coordinate and the y coordinate of each user selection with x and y coordinates for a subset of the plurality of characters in the response to obtain a distance value for each user selection;
sum the distance values for each user selection to obtain a total distance value; and
compare the total distance to a predetermined threshold, the server validating the user response when the total distance is less than the predetermined threshold, the validating comprising indicating to the web server that the user response passed the test.

9. The system of claim 8, wherein each character in the challenge and the response has a independently-determined font, size and orientation.

10. The system of claim 8, wherein the image has a vertical orientation.

11. The system of claim 8, wherein the image has a horizontal orientation.

12. The system of claim 8, wherein the characters in the challenge are a different color from the corresponding characters in the response.

13. The system of claim 8, the comparing the x coordinate and the y coordinate of each user selection further comprising:
comparing the x coordinate and the y coordinate of each user selection with the x and y coordinates of each of the plurality of characters in the response; and
associating each user selection with a character in the response with a minimum distance from the user selection, the total distance value equaling the sum of the distances between each user selection and the associated character in the response with the minimum distance from the user selection.

14. The system of claim 8, the server further storing a solution comprising an ordered list of coordinates for the characters in the challenge included in the response, the comparing the x coordinate and the y coordinate of each user selection comprising comparing the user selections in chronological order with corresponding x and y coordinates of the ordered list stored in the solution, the total distance value equaling the sum of the distances between each user selection and the corresponding x and y coordinates of the ordered list.

15. A computer program product comprising computer-readable program code to be executed by one or more processors when retrieved from a non-transitory computer-readable medium, the program code including instructions to:
provide a challenge on an interface, the challenge comprising a number of selected characters from a challenge character subset, the challenge character subset comprising characters from the 8-bit ASCII character range that leave a visible impression;
provide a response on the interface, the response comprising a plurality of characters from the challenge character subset, the response having a character count that is greater than the number of challenge characters and the response including the characters in the challenge, each character in the response having a font size selected from a range having a predetermined maximum, a predetermined orientation, and an x coordinate and a y coordinate, the challenge and the response together forming an image, the image being provided in response to a user request;
receive, by an input device, a plurality of user selections of locations in the interface, each user selection being associated with an x coordinate and y coordinate;
transmit the x coordinate and the y coordinate of each selection to a server, wherein the server:
compares the x coordinate and the y coordinate of each user selection with x and y coordinates for a subset of the plurality of characters in the response to obtain a distance value for each user selection;
sums the distance values for each user selection to obtain a total distance value; and
compares the total distance to a predetermined threshold, the server validating the user response when the total distance is less than the predetermined threshold, the validating comprising providing access to web content specified in the user request.

16. The computer program product of claim 15, wherein each character in the challenge and the response has a independently-determined font, size and orientation.

17. The computer program product of claim 15, wherein the image has a vertical orientation.

18. The computer program product of claim 15, wherein the image has a horizontal orientation.

19. The computer program product of claim 15, the comparing the x coordinate and the y coordinate of each user selection further comprising:
comparing the x coordinate and the y coordinate of each user selection with the x and y coordinates of each of the plurality of characters in the response; and
associating each user selection with a character in the response with a minimum distance from the user selection, the total distance value equaling the sum of the distances between each user selection and the associated character in the response with the minimum distance from the user selection.

20. The computer program product of claim 15, the server further storing a solution comprising an ordered list of coordinates for the characters in the challenge included in the response, the comparing the x coordinate and the y coordinate of each user selection comprising comparing the user selections in chronological order with corresponding x and y coordinates of the ordered list stored in the solution, the total distance value equaling the sum of the distances between each user selection and the corresponding x and y coordinates of the ordered list.

* * * * *